United States Patent [19]

Gonzalez

[11] 4,280,526
[45] Jul. 28, 1981

[54] LOCKABLE END PLUG FOR VALVE HOUSINGS

[75] Inventor: Ricardo Gonzalez, Holden, Mass.

[73] Assignee: Worcester Controls Corp., West Boylston, Mass.

[21] Appl. No.: 140,532

[22] Filed: Apr. 15, 1980

[51] Int. Cl.³ .............................................. F16K 43/00
[52] U.S. Cl. ................................... 137/315; 251/315; 251/316
[58] Field of Search .................. 137/315, 454.2, 454.5, 137/454.6; 251/148, 152, 157, 164, 315, 316, 317; 285/80, 257

[56] References Cited

U.S. PATENT DOCUMENTS

| 1,697,232 | 1/1929 | Ewald | 285/257 |
| 2,995,336 | 8/1961 | Usab | 251/315 |
| 3,016,226 | 1/1962 | Freeman | 251/315 |
| 3,234,958 | 2/1966 | Butters | 251/316 |
| 3,438,387 | 4/1969 | Scaramucci | 251/315 |
| 3,717,323 | 2/1973 | Geipel | 251/315 |

Primary Examiner—Martin P. Schwadron
Assistant Examiner—G. L. Walton
Attorney, Agent, or Firm—Pollock, Vande Sande & Priddy

[57] ABSTRACT

A valve, such as a ball valve of known configuration, is provided with an elongated housing which has an open end the internal diameter of which is sufficiently large to permit the insertion of a ball valve member into the housing during assembly of the valve. The open end of the housing is internally threaded and receives a hollow cylindrical externally threaded end plug which is screwed into the open end of the housing following insertion of the ball to retain the ball in place within the housing. The end plug is provided with a plurality of notches that are spaced from one another about the end plug axis, and, after the valve has been completely assembled, portions of the housing adjacent the said open end are deformed to provide locking tabs which extend into the end plug notches to prevent rotation of the end plug. The number of notches provided is preferably greater than the number of locking tabs so that, if the valve should be disassembled for purposes of repair or maintenance by removal of the locking tabs provided at the time of original assembly, new locking tabs can be deformed from the housing at locations angularly displaced from the positions of the original locking tabs for insertion into others of the end plug notches when the valve is reassembled.

15 Claims, 2 Drawing Figures

LOCKABLE END PLUG FOR VALVE HOUSINGS

BACKGROUND OF THE INVENTION

In the manufacture of ball valves, particularly bar stock valves wherein the housing is fabricated of a length of hollow bar stock, one common technique employed is to size the internal diameter of the housing at one end thereof so that it is sufficiently large to permit the ball and one or more seats to be inserted in sequence into the housing via said one end, whereafter the inserted elements are held in place by a hollow cylindrical end plug which is screwed into the housing opening through which the ball and seat were inserted. The end plug typically has an external thread which mesh engages an internal thread in the housing, and the end plug is screwed down into the housing sufficiently to hold the parts in assembled configuration.

A typical end plug which has been employed heretofore has an external flange of hexagonal or other configuration which can be grasped by an appropriate tool to screw the end plug into place during assembly of the valve. The interior diameter of the end plug is normally provided, moreover, with further threads which are adapted to thread engage a pipe with which the assembled ball valve is to be associated. If the end plug is not somehow locked to the ball valve housing after the end plug has been screwed into place, the possibility exists, e.g. when the ball valve assembly is unscrewed from an associated pipe line for service purposes or the like, that the end plug may be unscrewed from the ball valve housing along with the pipeline. This possibility poses serious risks in that, if there is fluid under pressure in the ball valve at the time the pipeline is being removed from the ball valve, the ball may fly out of the ball valve when the valve is removed from the pipeline along with the said end plug, or there may be a discharge of high pressure fluid from the interior of the ball valve which could cause possible injury to the operator, or the ball valve might simply fall apart.

To avoid these undesirable eventualities, it has been recognized heretofore that the end plug should preferably be locked to the ball valve housing after it has been screwed into place in the housing. One technique which has been suggested heretofore for this purpose is to weld the end plug into place after the ball valve is completely assembled. This technique cannot be employed, however, when the materials employed to fabricate the housing and end plug are, for example, brass, since brass is not weldable. Moreover, even when the elements being assembled are fabricated of steel, welding has the disadvantage that the parts cannot thereafter being readily disassembled to service the valve, and in addition, the welding operation tends to cause some splatter of the welding material which may contaminate the ball or seats. Further, considerable care must be taken to assure that the heat generated during the welding operation does not degrade the seat or parts of the valve adjacent the weld joint. The possibility of such degradation is, indeed, such a serious problem that it is impractical to use a brazing technique when the housing and end plug materials are formed of brass, stainless steel or carbon steel since brazing generates too much heat.

The locking of the end plug to the valve housing could be done by drilling one or more holes through the valve housing and into the end plug and then inserting a pin or pins into said holes. Such a pinning technique has a number of other disadvantages, however. It requires, for example, that the valve be machined after it has been assembled, and the the machining operation is one which necessarily produces chips which may end up inside of the valve and which could become embedded in the valve seat or score the ball. Also, unless a sufficient number of pins are employed, the pinning technique will not provide sufficient strength to keep the plug in place when the ball valve is unscrewed from a pipeline, but the provision of the comparatively large number of pins required to achieve adequate strength aggravates the chip problem. A pinning technique is moreover, time consuming and costly and, in addition, has the disadvantage that the end plug cannot be readily removed to service or repair the ball valve. Further, even where it is possible to remove the pins for service purposes, on subsequent reassembly of the valve it is highly unlikely that the previously machined holes will line up exactly, and therefore new holes may have to be drilled for the insertion of new pins at the time of reassembly, with a repetition of all of the problems mentioned.

The foregoing problems have been found, in practice, to be so difficult to solve that many valve manufacturers do not lock the end plug in place, and simply tolerate the risks which may be encountered in the use of an unlocked structure.

The present invention provides a novel valve housing structure which obviates all of the foregoing problems, which permits an end plug to be quickly and reliably locked in place when the valve is initially assembled, and permits the valve to be readily disassembled for repair or maintenance purposes and thereafter reassembled with the end plug again being quickly and reliably locked in place.

SUMMARY OF THE INVENTION

In accordance with the present invention, the end plug which is threaded into one end of a ball valve housing following insertion of the ball and associated seats therein, is provided with a series of notches around its outer exterior end which are adapted to receive lugs that are depressed into the notches from the body of the valve. The notches in the end plug are used in the first instance to screw the end plug into place, e.g. by use of a tool which engages the notches. Then, after the end plug is firmly seated into the housing to hold the ball valve and seats in assembled configuration, a portion of the body of the valve, such as a cylindrical collar portion which is formed on the body of the valve during the machining of the housing, is engaged by tools which shear spaced portions of the valve housing adjacent the said end plug notches, and which bend those sheared portions inwardly to provide locking tabs which extend into the notches on the end plug in engagement with the side walls of those notches to lock the end plug into place. As a result, after the valve has been completely assembled, and the end plug locked in place by the technique described, relative rotation between the end plug and its associated housing is prevented whereby a pipeline can be rotationally manipulated relative to the valve during attachment of the valve to or removal of the valve from such a pipeline without any danger of the valve becoming disassembled.

The locking arrangement, employing sheared locking tabs which are bent inwardly into the notches on the end plug, can be readily disengaged in the field simply by knocking the tabs out of the notches, e.g. by use of a cold chisel, whereafter the end plug can be readily unscrewed from the housing to permit access to the valve elements within the housing for purposes of repair or maintenance. After the valve has been repaired or maintained as necessary, and the end plug is again screwed back into place, new tabs can be formed in the field by again shearing and bending tabs into place using a cold chisel or the like. In this respect, the number of notches which are provided in the end plug is preferably greater than the number of locking tabs which are sheared and bent from the housing at the time of initial assembly of the valve, e.g. the end plug may be provided with four notches spaced from one another by substantially 90° with only two diametrically opposed ones of those notches receiving tabs at the time the valve is intially manufactured, and therefore, upon reassembly of the valve, there will be at least two other notches in the end plug which are disposed adjacent a portion of the valve housing that had not previously been used to form locking tabs, so that new tabs can be formed by an appropriate shearing and bending operation at the time of reassembly to again lock the end plug into place.

The notches and locking tabs are complementary in shape, and preferably have a rectangular configuration with side walls that extend in planes substantially parallel to the central axis of the end plug. In the preferred embodiment of the invention, the notches are provided as recesses or depressions in the outermost end face of the end plug, and the locking tabs are bent from a portion of the housing adjacent said outermost end face of the plug, from a position located radially outward of the external threads of the plug, toward the central axis of the plug in at least partially overlying relation to the outermost end face of the plug and into the notches. The bottom walls of the notches may be located in planes which are substantially orthogonal to the axis of the valve. However in an alternative arrangement, the bottom surface of each notch can be inclined so that it slopes downwardly and outwardly relative to the central axis of the plug whereby, when the locking tabs are bent into place, the tab bending commences at a point closer to the central axis of the valve thereby to reduce the amount of material which is required to form the tabs.

Instead of providing notches only in the end face of the end plug, and bending tabs only from the adjacent portion of the housing into such notches, the housing (or the cylindrical collar of the housing adjacent the end plug if such a cylindrical collar is provided) can also be formed with a plurality of notches which are adapted to receive tabs which are bent outwardly from the end plug into the notches in the housing. In such an arrangement, for example, two diametrically opposed notches can be provided in the end face of the end plug for engagement by a tool used to screw the end plug into place at the time of initial assembly or reassembly, and tabs can then be sheared and bent outwardly from portions of the end plug between those two notches into notches provided in the housing to achieve the desired locking function. Combinations of these arrangements can also be provided wherein locking tabs are bent outwardly from the end plug into notches in an adjacent portion of the housing, and wherein, in addition, locking tabs are bent inwardly from the housing into cooperating notches provided in the end plug. The simplest arrangement, however, and one which has been found to be completely reliable and asthetically preferable, is the arrangement wherein two tabs are bent from a cylindrical collar on the housing inwardly into two diametrically opposed notches provided in the end face of the end plug, with two other notches being provided in said end face of the end plug for the reception of locking tabs which are formed later, at the time of reassembly.

The invention finds particular utility in the fabrication of ball valves of the bar stock type, since it solves a long standing problem in connection with such valves. However the technique may be used in conjunction with housings for valves of other types wherein two hollow cylindrical members are thread engaged with one another to provide a fluid flow passageway communicating between the exterior and the interior of the housing, and wherein it is necessary or desireable to prevent relative rotation between those thread-engaged hollow cylindrical members after they have been properly assembled.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 2:
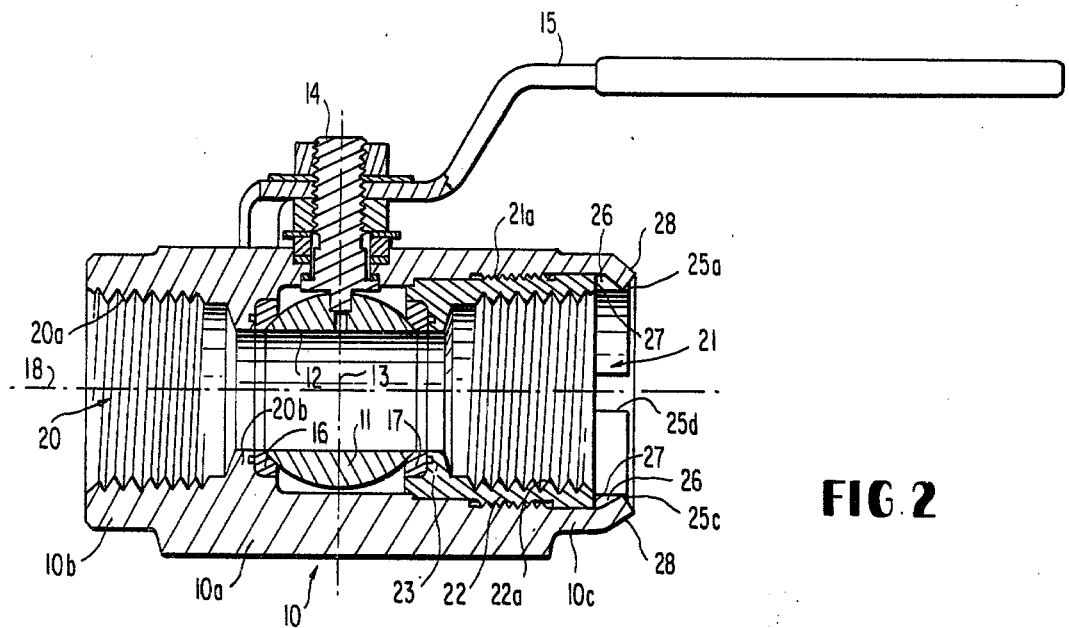
FIG. 2 is a side cross-sectional view of the ball valve and end plug, taken on line 2—2 of FIG. 1.

Referring to the drawings, a ball valve of the bar stock type comprises an elongated housing 10 which, in the form of the invention shown in the drawings, has a first body portion 10a of hexagonal cross section which merges, at its opposing ends, into a pair of cylindrical collars 10b, 10c. Housing 10 includes a valve member 11 of the ball type, having an elongated bore 12 extending therethrough in a direction transverse to the axis of rotation 13 of the ball, and the ball 11 is adapted to be selectively rotated through an angle of 90° by means of a stem 14 which extends through the housing 10 into engagement with the ball 11 and which is adapted to be rotated by a handle assembly designated 15. The ball 11 is supported between a pair of seats 16, 17 which are in sealing engagement with portions of the housing. This general structure is in itself well known and operates in known fashion to provide a fluid flow path through the housing generally along the axis of elongation 18 of the housing when the ball is rotated to a position wherein its bore 12 is in alignment with axis 18, and to block the flow of fluid through the housing when the ball is rotated through 90° so that its bore 12 is transverse to axis 18.

The housing 10, sometimes called the body of the valve, is provided with a pair of opposed open ends 20, 21 which are adapted, ultimately, to be connected to pipelines which carry the fluid to be controlled by the ball valve. Open end 20 has internal threads 20a therein for connection to one such pipeline, and merges into an integral, inwardly projecting shoulder 20b which supports seat 16. The internal diameter of open end 20 is, as best illustrated in FIG. 2, less than the outside diameter of ball 11.

The other open end 21 of the housing or body 10 also has internal threads 21a which are adapted to thread engage an end plug 22 that is provided with an inwardly extending shoulder 23 arranged to support the other seat 17. The internal diameter of the open end 21a, prior to screwing end plug 22 into place, is greater than the outside diameters of seats 16, 17 and of ball 11. The inside diameter of plug 22 corresponds to the inside diameter of open end 20 whereby, when plug 22 is screwed into place, internal threads 22a in the plug can be thread engaged with a pipeline of the same size as is threaded into threads 20a at the other end of the housing.

The valve is assembled, without the plug 22 initially being in place, through the enlarged open end 21 of the housing by inserting seat 16, ball 11, and then seat 17 in proper sequence through the enlarged open end 21 of the housing. The hollow tubular end plug 22 is then threaded or screwed into the hollow tubular end 21 of the housing until shoulder 23 on the end plug reaches the position wherein it supports seat 17, and thereby ball 11 and seat 16, in place within the housing. This insertion of the end plug 22 partially closes the enlarged open end 21 of the housing so that the resultant opening provided at the plug end of the housing corresponds dimensionally to the other open end 20 of the housing. The valve may then be placed in service by threading pipelines into the opposed open ends of the housing by use of internal threads 20a and 22a.

As has been discussed previously, the hollow tubular end plug 22 must be locked in place within the housing after the valve has been assembled to assure that the internal elements of the valve are properly maintained in position, and to prevent inadvertent disassembly of the valve, when the valve is in service and/or when the valve is to be taken out of service for repair or maintenance purposes. The locking arrangement which is employed in the present invention achieves this result in a fashion which is far simpler than locking arrangements suggested heretofore.

Figure 1:
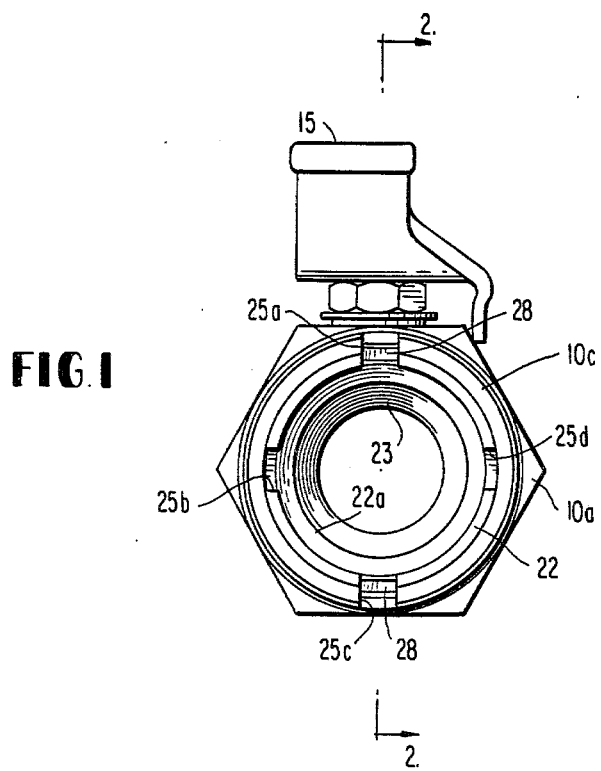
FIG. 1 is an end view of a ball valve employing a lockable end plug constructed in accordance with the present invention.

More particularly, the outermost end face of end plug 22 is provided with a plurality of substantially rectangular notches 25a–25d each of which has sidewalls 26 (see FIG. 2) that extend in planes substantially parallel to the central axis of hollow tubular end plug 22. Each notch also includes a bottom wall 27 which, in the embodiment illustrated in FIG. 2, extends in a plane substantially orthogonal to the central axis of the end plug but, as noted earlier, the bottom wall 27 of each notch may if desired be inclined so that it slopes downwardly and outwardly relative to the central axis of the plug. The four notches 25a–25d are spaced from one another by substantially 90° as best shown in FIG. 1, and are initially used during assembly of the valve, and in conjunction with an appropriate tool, to screw the plug into place.

When the end plug has been screwed into the body of the valve to the desired extent, its outermost end face is adjacent to the outer end face of that end of the housing which defines opening 21. Portions of the collar 10c on said housing are then engaged by tools which operate to shear a plurality of locking tabs from the said collar, and to bend said locking tabs toward the central axis of the valve into complementarily shaped notches provided on the outermost end face of plug 22. In the embodiment illustrated in the drawings, two such locking tabs 28 are sheared from diametrically opposed portions of housing collar 10c, and are bent in partially overlying relation to the outermost end of hollow tubular plug 22, into two diametrically opposed notches 25a, 25c that are provided in said outermost end of the plug.

It will be noted that, although the end plug is provided with four notches, only two of these notches are engaged by locking tabs. The use of two angularly spaced locking tabs, particularly when they are spaced from one another by substantially 180°, has been found in practice to provide adequate strength in the assembly to prevent relative rotation between plug 22 and housing 10 when a pipeline is screwed into or out of threads 22a. The other two notches, 25b and 25d are available for engagement with locking tabs that are formed at a subsequent time, e.g., after repair or maintenance of the valve if such is required.

More particularly, if it is desired to gain access to the interior elements of the valve after the valve has been completely assembled in the fashion described, the locking tabs 28 can be disengaged from their associated notches 25a, 25c by shearing the said locking tabs from collar 10c, e.g., by use of a cold chisel or the like. This permits the end plug 22 to be unscrewed from the housing, e.g., by engaging a tool with notches 25b, 25d. After the valve has been serviced, e.g., one or more new seats have been installed, the plug can then be screwed into place again, whereafter new locking tabs can be sheared and bent from the collar 10c for engagement with notches 25b, 25d. It will be appreciated that the portions of the collar which are sheared during such a reassembly operation are spaced by substantially 90° from the portions of the collar which were initially sheared to form tabs 28, and therefore the new locking tabs have the same strength characteristics as the original locking tabs.

While I have thus described a preferred embodiment of the present invention, variations will be apparent to those skilled in the art some of which variations have already been described. It must therefore be understood that the foregoing description is intended to be illustrative only and not limitative of the present invention, and all such variations and modifications as are in accord with the principles described are meant to fall within the scope of the appended claims.

Having thus described my invention, I claim:

1. A valve comprising a housing having a movable valve element therein for controlling the flow of a fluid through such housing, said housing having an internally threaded first hollow cylindrical member defining a fluid flow passageway which extends between the interior and exterior of said housing, an externally threaded second hollow cylindrical member in thread engagement with the internal threads of said first hollow cylindrical member, said second hollow cylindrical member also being internally threaded for thread engagement with an externally threaded pipeline to effect fluid flow communication between the pipeline and the interior of said valve housing, one of said first and second hollow cylindrical members having at least two recessed notches in its periphery, said notches being disposed in angularly spaced relation to one another about the central axis of said one cylindrical member, and the other of said first and second hollow cylindrical members having at least two integral locking tabs which are respectively complementary in shape to the shapes of said recessed notches, said locking tabs being angularly spaced from one another about the central axis of said other cylindrical member and being bent from the material of said other member into engagement with the walls of respective ones of said recessed notches to prevent relative rotation between said first and second hollow cylindrical members, whereby said pipeline may be rotationally manipulated relative to said second hollow cylindrical member without effecting concurrent relative rotation between said first and second hollow cylindrical members, said cylindrical members being adapted to be disassembled from one another after removal of said locking tabs from said notches, whereafter, following reassembly of said cylindrical members, said cylindrical members may be relocked to one another by bending at least one new locking tab into at least one of said notches from a portion of said other cylindrical member that is located between the original removed locking tabs.

2. The housing of claim 1 wherein said two notches are angularly spaced from one another by substantially 180°.

3. The housing of claim 1 wherein the outermost end face of said first hollow cylindrical member is disposed adjacent to the outermost end face of said second hollow cylindrical member, each of said locking tabs being bent from said first hollow cylindrical member from a position radially outward of the external threads of said second hollow cylindrical member, toward the common central axis of said first and second hollow cylindrical members and at least partially across the said outermost end face of said second hollow cylindrical member, said notches being recessed into said outermost end face of said second hollow cylindrical member.

4. In a valve of the type comprising an elongated housing having a valve element therein which is adapted to be rotated about an axis transverse to the axis of elongation of said housing to control the flow of a fluid through said housing, said elongated housing having a pair of opposed open ends located on opposite sides of said valve element to define therebetween a flow passage for the fluid which is to be controlled by said element, at least one of said open ends of said housing comprising a first hollow cylindrical member whose internal diameter is sufficiently large to permit the insertion therethrough and into said housing of said valve element during the assembly of said valve, and wherein said first hollow cylindrical member is internally threaded for the reception of a complementarily externally threaded second hollow cylindrical member of lesser internal diameter operative to partially close said one open end of said housing after said valve element has been inserted into said housing, the improvement wherein one of said hollow cylindrical members is provided with a plurality of separated notches located in angularly spaced relation to one another about the central axis of said one of said members, the other of said hollow cylindrical members being provided with a plurality of separated locking tabs which cooperate with respective ones of said notches to prevent relative rotation of said first and second hollow cylindrical members after said valve has been assembled, said locking tabs being angularly spaced from one another about the central axis of said other of said members and comprising spaced deformations of said other of said members which extend at an angle to the common axis of said first and second hollow cylindrical members from said other of said hollow cylindrical members into notches provided by said one of said hollow cylindrical members, undeformed portions of said other member, located between said locking tabs, beig adapted to be deformed into said notches to provide new locking tabs following disassembly and subsequent reassembly of said valve.

5. The valve of claim 4 wherein said locking tabs are provided by said first hollow cylindrical member and said notches are provided in said second hollow cylindrical member.

6. The valve of claim 4 wherein said valve element comprises an annular seat and a ball which engages said seat, said ball having a bore extending therethrough in a direction transverse to the axis of rotation of said ball, the innermost end of said second hollow cylindrical member being shaped to support said seat and thereby said ball in place within said housing.

7. The valve of claim 4 wherein each of said notches and locking tabs is substantially rectangular in cross section and has side walls which are disposed in planes extending substantially parallel to the central axis of said elongated housing.

8. The valve of claim 7 wherein each of said notches has a bottom wall which is disposed in a plane substantially orthogonal to the central axis of said elongated housing.

9. The valve of claim 4 wherein the number of said notches is greater than the number of said locking tabs, less than all of said notches having locking tabs therein after said valve is initially assembled, whereby said valve may be disassembled after removal of said locking tabs from the notches employed at the time of initial assembly, and said valve may thereafter be reassembled and further spaced deformations of said other of said members formed at locations angularly spaced from the removed locking tabs to extend as new locking tabs into previously unused ones of said notches.

10. In a ball valve of the type comprising an elongated housing which has an open hollow cylindrical end whose internal diameter is sufficiently large to permit the insertion of a ball into said housing during assembly of said ball valve, and wherein said open hollow cylindrical end of said housing is internally threaded to receive an externally threaded hollow cylindrical end plug which is screwed into said open end of said housing following insertion of said ball to partially close said open end and to retain said ball in place within said housing, said end plug also being internally threaded and adapted to thread engage a pipeline, the improvement wherein said end plug is provided with a plurality of notches spaced from one another about the periphery of said end plug, said one end of said housing being provided with a plurality of locking tabs which extend integrally from the material of said housing in spaced relation to one another and toward the central axis of said end plug into respective ones of said notches to prevent rotation of said end plug in said housing when said pipeline is being screwed into or unscrewed from said end plug, said end plug being removable from said housing after removal of said locking tabs from said housing and, following subsequent reassembly of said end plug into said housing, said end plug being adapted to be locked in place by forming at least one new locking tab from the material of said housing at a location spaced from the removed tabs.

11. The ball valve of claim 10 wherein said notches comprise a plurality of angularly spaced depressions in the outermost end face of said plug, the side walls of said depressions being disposed in planes substantially parallel to the central axis of said hollow cylindrical end plug, said locking tabs being bent at least partially across said outermost end face into engagement with said side walls.

12. The ball valve of claim 10 wherein the number of notches in said end plug is greater than the number of tabs extending from said housing.

13. The ball valve of claim 10 wherein said end plug is provided with four notches which are disposed adjacent the outermost end of said end plug and which are spaced from one another by substantially 90°, said housing being provided with two tabs which are diametrically opposed from one another and which extend into two diametrically opposed ones of said four notches.

14. The ball valve of claim 10 wherein said housing is shaped to define a substantially cylindrical collar at said open end of said housing, said collar being coaxial with the central elongated axis of said housing, said tabs comprising spaced portions of said collar which are bent from the outermost end of said collar toward said central elongated axis.

15. The ball valve of claim 10 wherein said housing comprises a main body portion having an external hexagonal cross section which merges into a pair of cylindrical collars disposed respectively at opposing ends of said main body portion, said tabs comprising spaced portions of one of said collars which are deformed from said one of said collars to extend at an angle to the central axis of said collar.

* * * * *